(12) United States Patent
Hiemeyer et al.

(10) Patent No.: US 10,295,247 B2
(45) Date of Patent: May 21, 2019

(54) VACUUM INSULATION BODY

(71) Applicants: Liebherr-Hausgeraete Lienz GmbH, Lienz (AT); Liebherr-Hausgeraete Ochsenhausen GmbH, Ochsenhausen (DE)

(72) Inventors: Jochen Hiemeyer, Karlstadt (DE); Michael Freitag, Wuerzburg (DE); Martin Kerstner, Wuerzburg (DE)

(73) Assignees: Liebherr-Hausgeraete Lienz Gmbh, Lienz (AT); Liebherr-Hausgeraete Ochsenhausen GmbH, Ochsenhausen (DE)

(*) Notice: Subject to any disclaimer, the term of this patent is extended or adjusted under 35 U.S.C. 154(b) by 0 days.

(21) Appl. No.: 14/908,903

(22) PCT Filed: Jul. 31, 2014

(86) PCT No.: PCT/EP2014/002117
§ 371 (c)(1),
(2) Date: Jan. 29, 2016

(87) PCT Pub. No.: WO2015/014499
PCT Pub. Date: Feb. 5, 2015

(65) Prior Publication Data
US 2016/0178269 A1    Jun. 23, 2016

(30) Foreign Application Priority Data

Jul. 31, 2013 (DE) .......... 10 2013 012 794
Oct. 9, 2013 (DE) .......... 10 2013 016 774

(51) Int. Cl.
*F16L 59/065* (2006.01)
*F25D 23/06* (2006.01)
*F27B 5/04* (2006.01)

(52) U.S. Cl.
CPC .......... *F25D 23/061* (2013.01); *F16L 59/065* (2013.01); *F25D 23/06* (2013.01);
(Continued)

(58) Field of Classification Search
CPC .......................... Y10T 428/231; F16L 59/065
See application file for complete search history.

(56) References Cited

U.S. PATENT DOCUMENTS

| | | |
|---|---|---|
| 4,486,482 A | 12/1984 | Kobayashi et al. |
| 5,600,957 A | 2/1997 | Manini et al. |

(Continued)

FOREIGN PATENT DOCUMENTS

| | | |
|---|---|---|
| DE | 695 04 984 T2 | 5/1999 |
| DE | 696 19 424 T2 | 7/2002 |

(Continued)

OTHER PUBLICATIONS

Translation of JP 61-66070 retrieved May 26, 2017.*
(Continued)

*Primary Examiner* — Alexander S Thomas
(74) *Attorney, Agent, or Firm* — Crowell & Moring LLP

(57) ABSTRACT

A vacuum insulation body includes at least one vacuum-tight casing and at least one vacuum region surrounded by the casing. The casing is provided with at least one opening, in particular with at least one evacuation port, for evacuating the vacuum region. At least one adsorbent material is present in the vacuum insulation body. The adsorbent material is partly or completely arranged in the region of the opening.

14 Claims, 1 Drawing Sheet

(52) U.S. Cl.
CPC .............. *F25D 23/062* (2013.01); *F27B 5/04* (2013.01); *F25D 2201/14* (2013.01); *Y10T 428/231* (2015.01)

(56) References Cited

U.S. PATENT DOCUMENTS

| | | |
|---|---|---|
| 5,693,399 A | 12/1997 | Himeshima et al. |
| 2007/0196665 A1 | 8/2007 | Tenra et al. |
| 2009/0186176 A1 | 7/2009 | Yamada et al. |

FOREIGN PATENT DOCUMENTS

| | | |
|---|---|---|
| DE | 11 2005 002 831 T5 | 9/2007 |
| DE | 11 2005 001 258 B4 | 9/2012 |
| EP | 2 105 648 A1 | 9/2009 |
| JP | 61-66070 A | 4/1986 |
| JP | 6-11247 A | 1/1994 |
| JP | 2000-280266 A | 10/2000 |

OTHER PUBLICATIONS

International Search Report (PCT/ISA/210) issued in PCT Application No. PCT/EP2014/002117 dated Oct. 28, 2014 with English translation (five pages).
German-language Office Action issued in counterpart German Application No. 14 757 523.0 dated Jul. 19, 2017 (four (4) pages).

\* cited by examiner

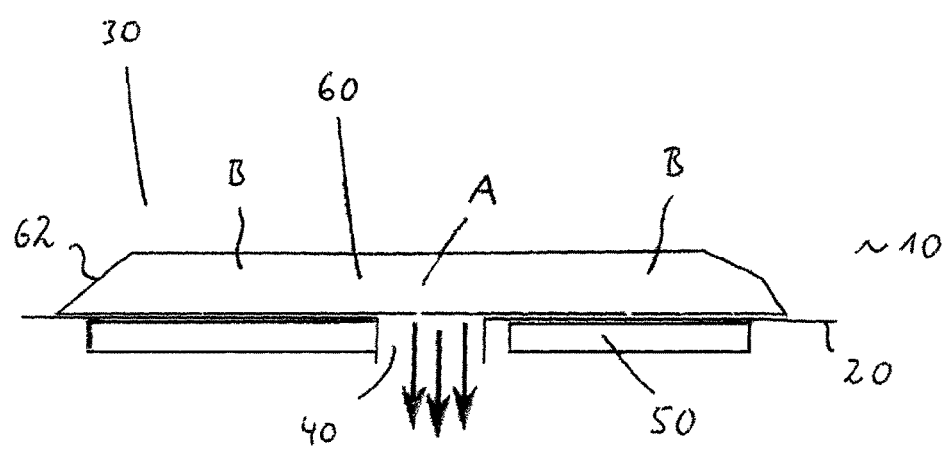

VACUUM INSULATION BODY

BACKGROUND OF THE INVENTION

The present invention relates to a vacuum insulation body with at least one vacuum-tight casing and with at least one vacuum region which is surrounded by the casing, wherein the casing is provided with at least one opening, in particular with at least one evacuation port, for evacuating the vacuum region, and wherein at least one adsorbent material is present in the vacuum insulation body.

From the prior art it is known to use vacuum insulation bodies for the heat insulation of refrigerators and freezers, which are present in the region between the outer shell of the appliance and the inner container or the inside of the door.

Such vacuum insulation bodies comprise a vacuum-tight casing and at least one vacuum region surrounded by the casing, in which a supporting or core material is present which provides the vacuum insulation body with the required mechanical stability and which in addition prevents that the sides of the casing rest against each other, when a vacuum exists.

Such vacuum insulation bodies are sensitive to an increase of the gas pressure in the vacuum region. Such introduction of gas or such increase of the gas pressure increases the thermal conductivity and thus reduces the effectiveness of the heat insulation body. In particular, due to the higher permeation rates as compared to oxygen and nitrogen, the permeation of water through the casing of the insulation body is decisive for an increase of the thermal conductivity of the vacuum insulation body.

To prevent this phenomenon or keep it as small as possible, it is known to put a material with a high adsorption capacity for water into the vacuum region, in order to keep the partial pressure in the vacuum region low even in the case of penetrating steam. As such material, a zeolite material can be considered, for example.

Furthermore, materials are known which by chemisorption of oxygen and nitrogen keep their partial pressure low. These materials are designated as "getters" and also serve to delay the aging of the vacuum insulation body due to gas entry of these gases.

It is known from the prior art to perform the vacuum generation in the vacuum insulation body in a vacuum chamber, which involves a comparatively high expenditure of apparatus. It is easier to provide the vacuum insulation body with an evacuation port at which negative pressure is applied and through which gas is withdrawn from the vacuum region.

In this case, the entire gas or an essential part of the gas must be removed from the interior space of the vacuum insulation body through the evacuation port. For this purpose, the gas must flow or diffuse through said core material to the evacuation port.

SUMMARY OF THE INVENTION

It is the object underlying the present invention to develop a vacuum insulation body as mentioned above to the effect that the same can be evacuated particularly easily and efficiently. This object is solved by a vacuum insulation body with the features claimed. Accordingly, it is provided that the adsorbent material partly or completely is arranged in the region of said opening.

When the adsorbent material, for example the dry material such as zeolites, or other adsorbent materials such as said getters, are incorporated into the vacuum insulation body, the gas particles adsorbed already at the surface of the drier or the adsorbent material, in addition to the gas molecules present in the pores of the core material, must also be removed during the evacuation process. Said gas particles, however, are detached from the surface of the adsorbent material only at low pressures. As possibly no more gas flow is present, i.e. no or hardly any convection occurs, these gas particles must diffuse to the evacuation port.

The same applies for getters incorporated into the vacuum region.

According to the invention it now is provided to arrange the material adsorbing gases, in particular water and/or nitrogen and/or oxygen, wholly or partly in the region of said opening of the vacuum insulation body. There, the lowest pressure occurs during the evacuation process and apart from this, the flow path of the gas particles bound to the adsorbent material is minimized, as the adsorbent material already is present in the region of the opening. When the adsorbent material, such as for example a drier or getter, thus is arranged in direct vicinity of the evacuation port or the opening, a particularly efficient vacuum generation is obtained in the vacuum region of the vacuum insulation body.

The present invention furthermore relates to a vacuum insulation body with other features claimed. Accordingly, it is provided that the vacuum insulation body is provided with at least one flow distributor which is formed such that it increases the effective flow cross-section during evacuation.

This flow distributor for example can include a plurality of individual bodies, preferably a plurality of individual spheres and particularly preferably a pebble bed or be formed by the same. Particularly preferably, the flow distributor is formed by an adsorbent material and in particular by the adsorbent material claimed. In this case, the material not only performs the function of the adsorbent, but also that of the flow distributor.

A flow distributor in the sense of the invention is understood to be a material which increases the effective flow cross-section and thus reduces the required time period for evacuation.

During evacuation, said flow distributor preferably is arranged in flow direction before or in alignment with the evacuation port, and particularly preferably in addition around this aligned region. It preferably is formed as pebble bed, for example as bed of zeolite spheres etc., which is located in a small bag or in some other receptacle which is permeable to gas.

The diameter of the individual bodies, in particular the spheres of the adsorbent medium or the flow distributor, preferably lies in the range of 3 to 5 mm. In a top view or in its extension vertical to the flow direction through the evacuation port, the dimension of the adsorbent material or the flow distributor preferably is at least 200 mm×200 mm.

Due to the geometry, a very small evacuation cross-section, i.e. a small area, is given in the region of the evacuation port during evacuation with the evacuation port. As a result, this region is by far the most critical region. To keep the duration of the evacuation process within industrially acceptable limits, it is advantageous when the effective evacuation cross-section is increased by means of the flow distributor. For this purpose, a further component would be necessary in principle, which must be designed pressure-resistant and thereby causes additional costs.

Although the use of an element used as flow distributor in addition to the adsorbent also is comprised by the invention, it is advantageous when the flow distributor is partly or completely formed by the adsorbent.

In the evacuation process two different pressure regimes must be observed: In the higher pressure range a laminar flow exists (Hagen-Poiseuille), the flow conductance of a component here depends on the cross-section to a high degree (in tubes proportional to $r^4$ and reciprocal to the length). Porous materials can be regarded as parallel connection of tubes with diameter~pore size. The area-specific flow conductance of porous materials is very much smaller than that of open lines. The flow conductance for laminar flow is linearly pressure-dependent. In the low pressure range (gas particles only collide with the walls, so to speak), the flow conductance is independent of the pressure and only depends on the geometry of the component. Depending on the pore size of the component, the molecular flow range is reached at differently high pressures.

Preferably, a bed of zeolite spheres with a diameter of 3-5 mm is used, which is arranged in a gas-permeable casing. For example, they can be sewn into a small bag of polyester fabric. These spheres spread out sufficiently large channels, in order to at the same time serve as flow distributor; an additional component thereby can be omitted.

Preferably, it thus is provided that the flow distributor is represented by the channels spread out by a pebble bed.

A combination of two of the inventive ideas claimed also is possible and also is comprised by the invention.

In a further aspect of the invention a heating device is provided, or the vacuum insulation body is at least temporarily connected with the same.

When the adsorbent material is heated by the heating device during the evacuation process, this leads to a displacement of the sorption equilibrium in direction of the desorption, so that also at comparatively high pressures the surface of the adsorbent material is covered only minimally. On cooling of the adsorbent material additional gas molecules can be attached, so that the adsorbent material acts as sorption pump which even after decoupling of the evacuation port or after closing of the same effectively reduces the gas pressure within the vacuum region or keeps the gas pressure low.

In addition to said adsorbent material, the vacuum insulation body of the present invention includes at least one core which preferably consists of pearlite.

Preferably, it is provided that the adsorbent material or the flow distributor is arranged directly adjacent to said opening. As explained above, an advantage in this case consists in that the flow path of the gas particles towards the opening is short and furthermore in that in the region of the opening a very low pressure exists.

Furthermore, it is conceivable that the adsorbent material and/or the flow distributor and/or the heating device is arranged such that it surrounds the opening. In particular for the case that the adsorbent material or the flow distributor is arranged in the region of the opening, the advantage is obtained therefrom that this material can effectively be heated by the heating device and thus a favorable desorption during the evacuation process and hence an efficient evacuation is possible.

It is conceivable for example that the heating device is arranged on the one side of the casing of the vacuum insulation body and the adsorbent material or the flow distributor is arranged on the other side, namely on the inside, of the casing of the vacuum insulation body.

In a further aspect of the invention it is provided that the adsorbent material or the flow distributor is arranged in a region which is adjacent to the opening. This means that the adsorbent material and/or the flow distributor is not or not only arranged in the region aligned with the opening, but also in regions adjacent thereto.

In a further aspect of the invention it is provided that the adsorbent material and/or the flow distributor is arranged such that the gas passing through the opening during the generation of vacuum passes through the adsorbent material and/or through the flow distributor and/or that at least one means is provided which reduces the flow resistance during the process of vacuum generation.

A volume of adsorbent material or of the flow distributor such as zeolite spheres forms a sufficient flow cross-section also under pressure load, in order to effectively accelerate the evacuation step. It is conceivable, for example, to mount the adsorbent material directly at the evacuation port or at the opening. Thus, the adsorbent material according to the invention also can serve as flow distributor to increase the effective evacuation cross-section.

In principle, there can also be employed other means or measures, in order to increase the flow cross-section or to reduce the flow resistance during the evacuation.

In a further aspect of the invention it is provided that the heating device is arranged such that by means of the heating device the entire vacuum insulation body can be heated. Thus, in this aspect of the invention not only the region of the opening is heated, but the entire vacuum insulation body. Since many core materials of vacuum insulation bodies have adsorptive properties, in particular for steam, a complete heating of the vacuum insulation body can be expedient, in order to also facilitate or accelerate the desorption from the core material.

In a further aspect of the invention it is provided that the adsorbent material is formed such that the adsorption of water and/or nitrogen and/or oxygen is effected. Preferably, the adsorbent material is the at least one getter and/or zeolite material.

The present invention furthermore relates to a refrigerator and/or freezer with at least one body and with at least one cooled interior space which is surrounded by the body, and with at least one closure element by means of which the cooled interior space can be closed, wherein between the cooled interior space and the outer wall of the appliance at least one interspace is located. According to the invention it is provided that in this interspace at least one vacuum insulation body with the features claimed is arranged. This interspace can be located e.g. between inner container and outer wall and/or between the inside of the door etc. and its outside.

The invention furthermore relates to a method for generating a vacuum in a vacuum insulation body according to the invention, wherein during and/or before the generation of the vacuum in the vacuum insulation body heating of the vacuum insulation body or a partial region of the vacuum insulation body and preferably of the opening and/or around the opening and in particular heating of the adsorbent material is effected.

The heating device can be a firm part of the vacuum insulation body. Preferably, however, it is provided that the heating device is connected with the vacuum insulation body only during the generation of the vacuum and then is again taken away or removed from the same.

Further details and advantages of the invention will be explained in detail with reference to an exemplary embodiment illustrated in the drawing.

BRIEF DESCRIPTION OF THE DRAWING

The only drawing FIGURE, referred to below as FIG. 1, shows a sectional view through a vacuum insulation body in the region of the evacuation port.

DETAILED DESCRIPTION OF THE INVENTION

In FIG. 1, a partial region of a vacuum insulation body according to the invention is designated with the reference numeral 10.

This vacuum insulation body includes a vacuum-tight film or a high-barrier film 20 as well as a core material 30, which can be a bed, such as for example pearlite.

Reference numeral 40 designates an opening or an evacuation portion which during the evacuation process is connected with a non-illustrated vacuum pump, so that according to the direction of the arrow a flow is generated from the vacuum region and the vacuum thus is generated.

As is furthermore shown in FIG. 1, in the region (in the illustrated flow direction during evacuation) directly before the opening 40 in the vacuum region an adsorbent material 60 is located, such as a drier/getter, e.g. zeolite, which is arranged not only in the region which is in alignment with the opening 40, but also in the regions adjacent thereto. In FIG. 1, the aligned region is designated with the reference character A and the adjacent regions are designated with the reference character B. These adjacent regions can surround the opening in a disk-shaped or circular manner.

On the outside of the casing of the vacuum body a heating region or a heating device 50 is arranged, which has the task to effect heating of the drier or getter material during the evacuation.

Due to the fact that the material 60 is arranged in direct vicinity of the evacuation port 40, a particularly efficient evacuation can be performed, as there the lowest pressures occur and in addition the flow path of the gas particles bound to the material 60, such as water, oxygen or nitrogen, is minimized.

The fact that the adsorbent material offers enough flow cross-section also under pressure load leads to the fact that the step of the evacuation is accelerated effectively. The illustrated adsorbent material 60 for example can be mounted in a fleece bag or in some other receptacle at the evacuation port. In this way, the adsorbent material also serves as flow distributor for increasing the effective evacuation cross-section or for increasing the effective flow conductance.

The fact that the adsorbent material is located in the region of the opening of the vacuum insulation body in addition provides for an effective heating of the adsorbent material by a heating device and hence for a particularly good desorption of adsorbed gas particles.

When after the evacuation process the evacuation port is closed in a vacuum-tight manner and the heating device is switched off, cooling of the material 60 takes place. This in turn leads to the fact that gas molecules still present are attached to the material, so that the material 60 acts as sorption pump which keeps the gas pressure low also after decoupling the evacuation port, i.e. after vacuum-tight closing of the vacuum insulation body.

As explained above, the adsorptive material can be designed such that it adsorbs steam and/or nitrogen and/or oxygen with high sorption enthalpy.

The invention claimed is:

1. A vacuum insulation body comprising:
   at least one vacuum-tight casing, with at least one vacuum region surrounded by the casing, and
   at least one flow distributor, wherein
   the casing is provided with at least one opening forming an evacuation port for evacuating the vacuum region, and the vacuum insulation body incorporates an adsorbent material and a core material, wherein
   the adsorbent material is formed from at least one dryer and/or a getter, wherein
   the adsorbent material is located directly before the evacuation port as well as in regions directly adjacent to the evacuation port, wherein
   the at least one flow distributor serves to increase an effective evacuation cross-section, and the flow distributor is formed by an adsorbent material, wherein, during evacuation, said flow distributor is arranged in a flow direction before the evacuation port, and wherein
   the flow distributor is formed as a pebble bed, which is located in a receptacle permeable to gas, wherein
   the adsorbent material is arranged such that gas passing through the opening passes through the adsorbent material during vacuum generation.

2. The vacuum insulation body according to claim 1, wherein the flow distributor includes a plurality of individual bodies.

3. The vacuum insulation body according to claim 2, wherein the individual bodies are individual spheres.

4. The vacuum insulation body according to claim 2, wherein the individual bodies are included in a pebble bed.

5. The vacuum insulation body according to claim 1, further comprising at least one heating device provided therewith or connected thereto.

6. The vacuum insulation body according to claim 5, wherein the heating device is located outside the casing.

7. The vacuum insulation body according to claim 1, wherein the adsorbent material is arranged such that it surrounds the opening.

8. The vacuum insulation body according to claim 1, wherein the heating device is arranged such that the entire vacuum insulation body can be heated by the heating device.

9. The vacuum insulation body according to claim 1, wherein the adsorbent material is formed to adsorb at least one of water, nitrogen, and oxygen.

10. A refrigerator and/or freezer appliance comprising:
    at least one body with at least one cooled interior space surrounded by the body, and
    at least one closure element by which the cooled interior space can be closed,
    wherein, between the cooled interior space and an outer wall of the appliance, at least one interspace is located, and
    wherein at least one vacuum insulation body according to claim 1 is arranged in the interspace.

11. The vacuum insulation body according to claim 1, wherein the flow distributor is arranged such that it surrounds the opening.

12. The vacuum insulation body according to claim 1, wherein the flow distributor is arranged such that gas passing through the opening passes through the flow distributor during vacuum generation.

13. A refrigerator and/or freezer appliance comprising:
    at least one body with at least one cooled interior space surrounded by the body, and
    at least one closure element by which the cooled interior space can be closed, wherein, between the cooled interior space and an outer wall of the appliance, at least one interspace is located, and wherein at least one vacuum insulation body according to claim 1 is arranged in the interspace.

14. The vacuum insulation body according to claim 1, wherein the flow distributor is adsorbent material arranged in a region adjacent to the opening.

* * * * *